July 7, 1970
C. B. ROBERTS
3,519,398
AUTOMATIC SYSTEM FOR CONTROLLING ENVIRONMENT OF
INERT ATMOSPHERE BOX
Filed April 1, 1968
2 Sheets-Sheet 1
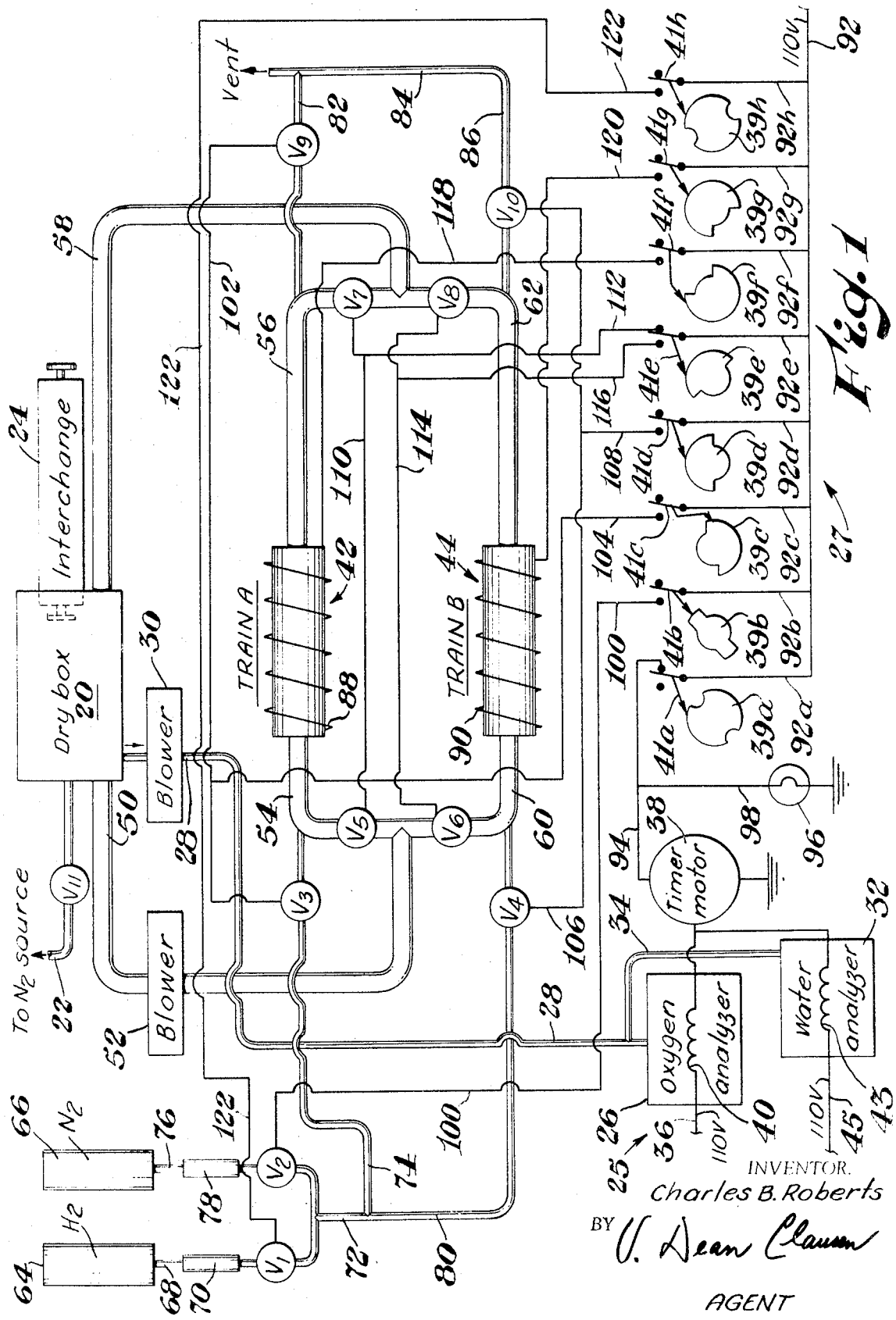
INVENTOR.
Charles B. Roberts
BY J. Dean Clausen
AGENT

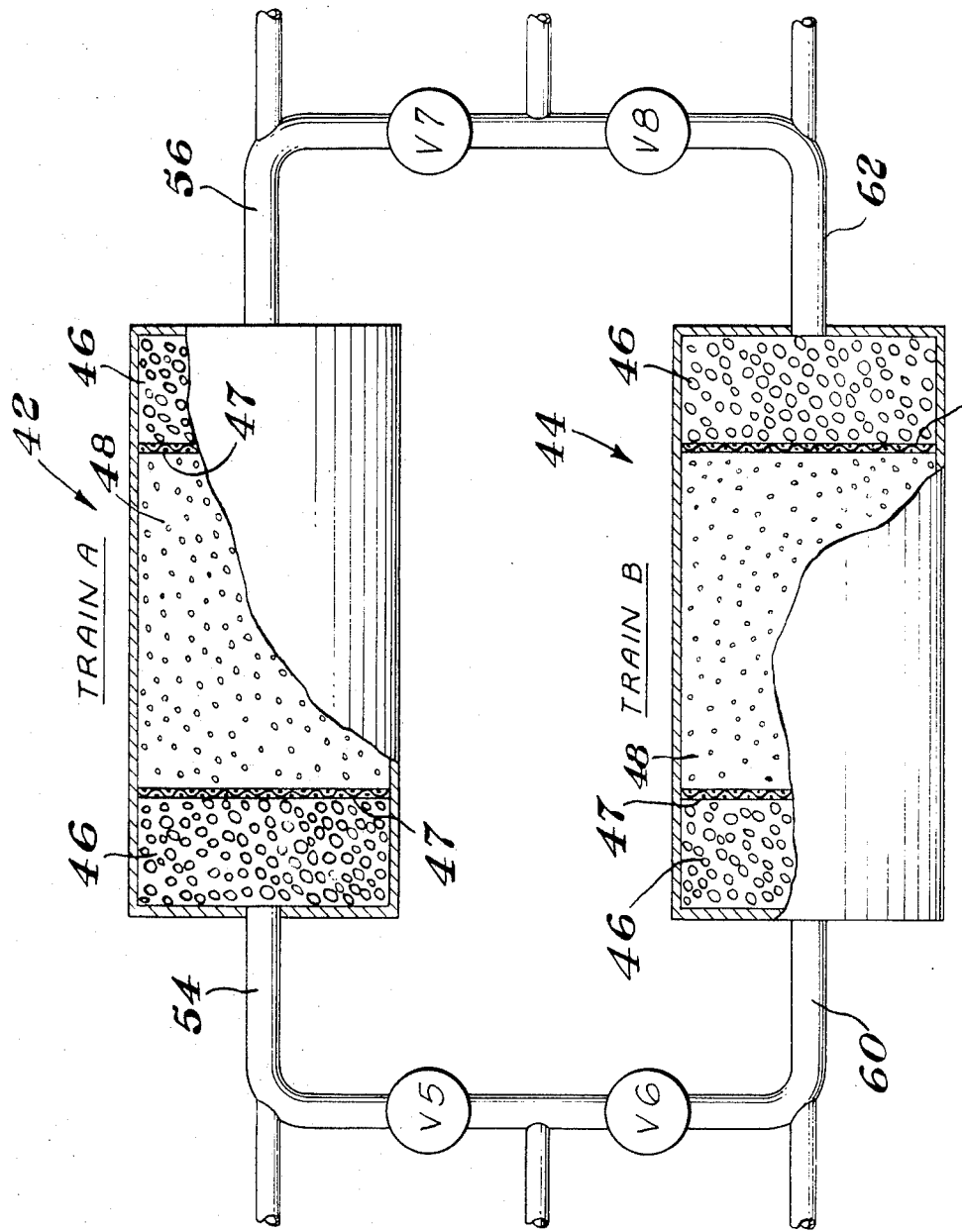

United States Patent Office 3,519,398
Patented July 7, 1970

3,519,398
AUTOMATIC SYSTEM FOR CONTROLLING ENVIRONMENT OF INERT ATMOSPHERE BOX
Charles B. Roberts, Midland, Mich., assignor to The Dow Chemical Company, Midland, Mich., a corporation of Delaware
Filed Apr. 1, 1968, Ser. No. 717,887
Int. Cl. B01j 7/00
U.S. Cl. 23—281    7 Claims

ABSTRACT OF THE DISCLOSURE

This invention relates generally to an inert atmosphere box, which is commonly referred to in the art as a "dry" box. More specifically, the invention concerns an electrical-mechanical system for automatically maintaining atmospheric oxygen or moisture in an inert atmosphere box at a significantly low level to provide a substantially "dry" environment in the box.

---

One of the principal uses of a "dry" box is in the preparation of so-called pyrochoric, or moisture and/or oxygen degradable compounds. Such compounds, which might be characterized, e.g., by various hydrides, such as Na, Al and Li hydrides, and the metal alkyls, can spontaneously ignite or be detrimentally degraded when exposed to atmospheric oxygen and moisture. Consequently, the preparation of such compounds is generally conducted in a closed system, such as a "dry" box, in which the environment consists principally of an oxygen and moisture-free, chemically-inert gas, such as nitrogen, argon, helium, or the like.

Depending upon the type of materials to be reacted, it is frequently necessary to maintain the atmospheric oxygen and water (moisture) levels of a "dry" box at no more than about 1 p.p.m. of the inert gas in the box. Prior to this invention, one method for maintaining a low oxygen and water level was to continuously flush the box with a purified inert gas (usually of the same type as used in the box). Such a system is generally unsatisfactory and costly in that it is a manually operated procedure requiring constant attention and a considerable amount of a skilled operator's time. In a more advanced method, which is a semi-automatic operation, contaminating oxygen and water in a dry box are removed by circulating the box atmosphere through a chemical train unit containing oxygen-scrubbing and water-removing materials. The oxygen scrubber usually comprises a bed of copper particles which must be maintained at a relatively high temperature, i.e. about 600° C. Since the heat generated in the oxygen scrubber is undesirable in the atmosphere of the dry box, a cooling means (such as a refrigeration system) must be included in such a system in order to cool the regenerated inert gas atmosphere before it is recirculated into the box. Another disadvantage of such a system is that the hydrogen required for reactivation of the copper bed in the oxygen scrubber must be manually added either to the atmosphere of the box itself or through an isolated regenerating system if the materials being prepared in the box cannot tolerate hydrogen. Further, in such a system the water-removing material in the chemical train unit, which is usually a molecular sieve material, must be periodically regenerated by manually heating the sieve material and venting to the atmosphere the water thus driven off. After drying, the sieve material must be allowed to cool before the train unit can be used to purify the atmosphere of the dry box. Such a procedure represents a distinct disadvantage in that operation of the dry box must be discontinued, that is, the box must be shut down during the entire time the purifying train is being regenerated.

A broad object of the present invention is to provide a fully automatic electrical-mechanical system for controlling the environment in an inert atmosphere box which eliminates the disadvantages of the prior systems.

A more specific object of the invention is to provide a system for automatically controlling the oxygen or water content of an inert atmosphere box below a predetermined amount, e.g. about 1 p.p.m. of the inert gas in the box.

Another object of this invention is to provide a system for continuously removing oxygen and/or moisture from the environment of an inert atmosphere box by circulating the atmosphere through one unit of a dual chemical train, while a second unit of the train is being regenerated.

Another object of the invention is to provide a system which does not require a refrigeration system or other means for cooling the inert atmosphere circulated through the chemical train unit before re-entry into the box.

A further object of the invention is to provide a system for removing oxygen and moisture from a dry box atmosphere which will operate for an indefinite period of time without the attention of an operator.

Other objects and advantages of this invention will be apparent from reference to the following description taken in conjunction with the accompanying drawing in which:

FIG. 1 is a schematic illustration of one form of an electrical-mechanical system which may be used in the practice of this invention.

FIG. 2 is an enlarged fragmentary view of a portion of the system as shown in FIG. 1. FIG. 2 illustrates in greater detail a dual chemical purifying train unit as a part of the over-all system.

This invention can be better understood from the following description taken in conjunction with the accompanying drawing. The drawing illustrates only one of numerous embodiments within the scope of the invention and the form shown is selected for convenient illustration and clear demonstration of the principles involved. Corresponding parts of the embodiment illustrated herein are designated with the same numerals.

GENERAL DESCRIPTION

Referring to the automatic system of this invention, as shown in the drawing, numeral 20 refers to a conventional inert atmosphere box (commonly referred to as a "dry" box), which is equipped on one end with a gas line 22 for supplying a suitable inert gas, such as nitrogen, to the box. To maintain the inert gas environment in box 20 at the desired operating level, the pressure of the incoming gas is controlled by a solenoid-operated valve $V_{11}$ installed in gas line 22, the valve being actuated by a pressure gauge (not shown) mounted on box 20 and connected to the valve through an electrical lead. An interchange chamber 24 mounted on box 20 at the end opposite gas line 22 provides means for introducing and removing materials to be reacted in the dry box. Since the operation of the interchange chamber is well known to those skilled in the art and since it does not form an inherent part of the invention described herein, no further description of the interchange chamber is considered necessary at this point. Moreover, the operation and construction of one embodiment of an interchange chamber operable in the practice of the present invention is described in detail in U.S. application Ser. No. 692,588, filed Dec. 21, 1967, copending herewith and assigned to the instant assignee and now issued as Pat. No. 3,474,823 of Oct. 28, 1969.

To maintain a substantially "dry" environment in the inert atmosphere box 20, the automatic electrical-mechanical system of this invention comprises, in general, an oxygen-water analyzing unit 25 for sensing the level of atmospheric oxygen or water in the box, which, in association with a timer motor unit assembly 27 automatically controls a dual chemical purifying train unit through which the inert gas atmosphere of the box is circulated to remove a substantial portion of the contaminating oxygen and water in the dry box environment.

In the oxygen-water analyzing unit 25 there is provided an oxygen analyzer 26 (such as a conventional Beckman oxygen analyzer) which connects to box 20 through a line 28, with a conventional light duty blower 30 installed therein. Forming a part of the same oxygen-water analyzing unit 25 is a water analyzer 32 (such as a conventional Du Pont sorption hygrometer) which is linked to box 20 through a line 34 which branches from line 28 at a point above the oxygen analyzer. In a practical sense, the water analyzer 32 would generally function as an auxiliary piece of equipment since close control of the level of atmospheric oxygen in the dry box is usually sufficient to automatically maintain the atmospheric moisture content at a desirably low level. Electrical means for initiating removal of oxygen and/or water from box 20 are provided by a lead 36 which connects a conventional synchronous timer motor 38 with a source of power through a relay 40 in oxygen analyzer 26, or through a lead 45 which connects motor 38 with a source of power through a relay 43 in water analyzer 32.

A portion of the timer motor unit assembly 27 which controls operation of the dual chemical purifying train unit (as explained in more detail hereinafter) is provided by a battery of timer cams $39a$ through $39h$, inclusive, which are mounted on a common shaft (not shown) connected to motor 38. Regeneration of each train in the chemical purifying unit is controlled by motor 38, which rotates each timer cam through a 6-hour cycle, in which the cam operates a corresponding microswitch, $41a$ to $41h$, inclusive, to open or close various solenoid-actuated valves in the chemical purifying train unit, as controlled by a "dwell" portion (switch open) and a "ride" portion (switch closed) on each cam. With regard to the various "dwell" and "ride" portions, cams $39a$ and $39h$ each have two opposing 1-hour dwell portions with two opposing 5-hour ride portions; cam $39b$ has two opposing 5-hour "dwell" portions with two 1-hour ride portions; cams $39c$ and $39d$ each have a 5-hour dwell portion and a 5-hour ride portion; cams $39f$ and $39g$ each have a 3-hour dwell portion with a 9-hour ride portion; and cam $39e$ has a 6-hour dwell portion with a 6-hour ride portion.

Removal of atmospheric oxygen or moisture from the dry box is accomplished with a dual chemical purifying train unit, designated as Train A and Train B in FIGS. 1 and 2 of the drawing. As best shown in FIG. 2, each train comprises a metal cylinder or column 42 (Train A) and 44 (Train B), containing materials which will remove either oxygen or water from an inert gas atmosphere circulated through the column. A portion of each train is shown partly in section in FIG. 2 to illustrate positioning of the water removing material 46 and the oxygen-removing material 48 in each train. The preferred water-removing material 46 is a commercially available molecular sieve, which is packed in a layer at the end of each column 42 and 44, while the preferred oxygen-removing material 48 is a copper-nickel catalyst, which is packed in the center of each column between the molecular sieve layers. A metal screen 47 may be used to separate the molecular sieve from the catalyst if desired, but this is optional, since it has no appreciable effect on the function of these materials in removing oxygen and water from a gas passing through the column. Other suitable commercially available water-removing materials which may be used include activated alumina, magnesium perchlorate, silica gel, and the like. The preferred oxygen-removing catalyst is a commercially available material consisting of about 99.9 wt. percent Cu and 0.1 wt. percent Ni in finely divided form on a gamma-alumina carrier. Representative of other suitable commercially available catalytic materials which may be used as oxygen removers include finely divided Cu on silica gel, Cu-Ni on diatomaceous earth (99% Cu-1 Ni), Cu-Hg supported on activated alumina (90% Cu-10% Hg), and the like.

To provide for circulation of the inert gas atmosphere of the dry box through Train A, column 46 connects to box 20 through a main input line 50, with a conventional light duty blower 52 installed therein, and a branch line 54 which leads into column 46. For adequate circulation of the dry box atmosphere through the purifying train, the blower 52 should have a capacity of at least 40 c.f.m. Circulation of the purified dry box gas atmosphere from Train A back into box 20 is through branch line 56 and main return line 58 which connects to box 20. When Train A requires regeneration it may be closed off by solenoid-actuated valve $V_5$ in line 54 and solenoid-actuated valve $V_7$ in line 56. Circulation of the inert gas atmosphere to Train B is provided through input line 50 and branch line 60, which leads into column 48. Circulation of the purified inert gas from Train B back into box 20 is provided through branch line 62 which connects with return line 58. When Train B requires regeneration it may be closed off by solenoid-actuated valve $V_6$ in line 60 and solenoid-actuated valve $V_8$ in line 62.

Regeneration of the oxygen-removing material (i.e. the Cu-Ni catalyst) in Trains A and B is effected by a hydrogen-nitrogen purge (about 1 parts $H_2$:10 parts $N_2$) of each train, as obtained from a conventional hydrogen cylinder 64 and nitrogen cylinder 66. With valve $V_5$ closed, flow of $H_2$ from cylinder 64 to Train A is through branch line 68, flowmeter 70, main line 72 and branch line 74, which connects with branch line 54 leading into column 42. Nitrogen flows into Train A when valve $V_5$ is closed is through branch line 76, flowmeter 78, main line 72, branch line 74 and into branch line 54. Closing of solenoid-actuated valve $V_3$ in line 74 and closing of valve $V_6$ in line 50 will divert the flow of hydrogen and nitrogen in cylinders 64 and 66 into Train B through main line 72 and branch line 80, which connects with branch line 60 leaing into column 44. During regeneration of Train A, the expended $H_2/N_2$ mixture flowing out of column 42 is vented to the outside through branch line 56, which connects with branch line 82 leading into a main vent line 84. The expended $H_2/N_2$ mixture flowing out of column 44 during regeneration of Train B is directed through branch line 62, which connects with branch line 86 leading into main vent line 84.

Regeneration of the water-removing material (i.e. the molecular sieves) in Trains A and B is effected by heating of columns 42 and 44 to a temperature suitable for drying out the sieve material. The drying is accomplished by means of conventional heating wires 88 and 90, which are placed around each column. Heat from wires 88 and 90 also provides the required temperature necessary to initiate the reaction of the $H_2$ from cylinder 64 with the oxygen-removing catalyst in Trains A and B. To maintain a desired temperature for drying of the sieve material and regeneration of the catalytic material (i.e. from about 200° C. to about 300° C.), the temperature of the heating wires are regulated by a conventional temperature controller in association with thermocouples (not shown) which are placed in the molecular sieve portions of each train.

Referring again to the timer motor assembly 27, microswitches $41a$–$41h$ are connected to a suitable source of power through a common lead 92 and branch leads $92a$ to $92h$. Initiation of timer cams $39a$ to $39h$ in the timer motor unit is provided by lead 94 which connects microswitch $41a$ with timer motor 38. A signal to indicate that regeneration of the purifying train unit is in progress, is provided by a small conventional bulb 96, which connects into the timer motor circuit thread lead 98. As mentioned hereinbefore, the various solenoid-actuated valves in the automatic system of this invention are operated by the various timer cams and their corresponding microswitches in the timer motor circuit. As indicated in the drawing, valve $V_2$, which controls the nitrogen flow from cylinder 66, is operated by cam 39b through a lead 100 which connects the valve with microswitch 41b. Valves $V_3$ and $V_9$, which control the passage of the regenerating purge gas mixture through Train A, are operated by cam 39c through a common lead 102 and a branch lead 104, which connect the valves with microswitch 41c. Valves $V_4$ and $V_{10}$, which control the passage of the regenerating purge gas mixture through Train B, are operated by cam 39d through a common lead 106 and a branch lead 108, which connect the valves with microswitch 41d. Valves $V_5$ and $V_7$ which control the flow of the inert gas atmosphere from box 20 through Train A, are operated by cam 39e through a common lead 110 and a branch lead 112, which connect the valve with microswitch 41e. Valves $V_6$ and $V_8$, which control the flow of the inert gas atmosphere from box 20 through Train B are also operated by cam 39e through a common lead 114 and a branch lead 116, which connect the valves with microswitch 41e. Current to heating wire 88, which controls the regenerating temperature of Train A, is supplied by the operation of cam 39f through lead 118 which connects the heating wire with microswitch 41f through a heavy duty relay (not shown). Current to heating wire 90, which controls the regenerating temperature of Train B, is supplied by the operation of cam 39g through lead 120 which connects the heating wire with microswitch 41g through a heavy duty relay (not shown). Valve $V_1$, which controls the hydrogen flow from cylinder 64, is operated by cam 39h through a lead 122 which connects the valve with microswitch 41h.

OPERATION

A typical operation of the automated system of this invention in maintaining the atmospheric oxygen or moisture in the dry box at a desirable level is generally as follows. Oxygen analyzer 26 and water analyzer 32 are set to detect a given amount of oxygen or moisture (for example, about 1 p.p.m.) in the inert gas atmosphere of box 20. Since, under normal operating conditions, the oxygen-removing catalyst in the purifying train unit generally requires regeneration before the water-removing molecular sieve material, it will be understood that the oxygen analyzer would normally be sufficient to effect the simultaneous regeneration of both the catalytic material and the sieve material. In those instances where the moisture content of the dry box atmosphere may be of prime importance, however, the water analyzer may be employed as the sole control device. For purposes of explaining the practice of this invention, reference will be made only to use of the oxygen analyzer as the control device.

During a normal course of operation of box 20, valves $V_5$ and $V_7$ are open and valves $V_1$, $V_2$, $V_3$, $V_4$, $V_6$, $V_8$, $V_9$ and $V_{10}$ are closed, thus allowing the inert gas atmosphere in the box to circulate through Train A. At this point Train B, which has previously been regenerated, is on stand-by duty. Once the molecular sieve portion 46 and catalyst portion 48 in Train A becomes saturated, the oxygen level of the inert gas atmosphere in box 20 will begin to exceed the predetermined level as set in oxygen analyzer 26. When this occurs, relay 40 in oxygen analyzer 26 will close the thereby start timer motor 38 to maintain operation of the timer motor assembly. Motor 38 will thus rotate the various timer cams in the motor unit to positions which will open valves $V_2$, $V_3$, $V_6$, $V_8$ and $V_9$; close valves $V_5$ and $V_7$ apply current to heating wire 88. This will allow nitrogen from cylinder 66 to flow through and purge Train A and the heat from wire 88 to dry the molecular sieve portion 46. After heating wire 88 has been on for approximately 2 hours, valve $V_1$ will open to allow hydrogen from cylinder 64 to flow through Train A and thereby regenerate the catalyst portion 48. After a regeneration period of about 1 hour valve $V_1$ will close and current to heating wire 88 will go off. After the train has cooled for about 3 hours, valves $V_2$, $V_3$ and $V_9$ will close and timer motor 38 will be shut off by rotation of cam 39a. At this point the regeneration of Train A is complete and further initiation of the timer motor unit is returned to oxygen analyzer 26 (that is, timer motor 38 will again be started by relay 40 only when the oxygen content in the inert gas atmosphere of box 20 exceeds the predetermined level set in the analyzer). From the foregoing description, it will be appreciated that with valves $V_5$ and $V_7$ closed and valves $V_6$ and $V_8$ open, the inert gas atmosphere in box 20 will circulate through Train B while Train A is being regenerated.

During circulation of the inert gas atmosphere through Train B, the timer motor assembly will remain off until the molecular sieve portion 46 and catalyst portion 48 in Train B become saturated. When this occurs, the inert gas atmosphere in box 20 will again exceed the predetermined level as set in oxygen analyzer 26 and relay 40 will close and thereby start timer motor 38. Motor 38 will rotate the various timer cams in the motor unit to positions which will open valves $V_2$, $V_4$, $V_5$, $V_7$ and $V_{10}$; close valves $V_6$ and $V_8$ and apply current to heating wire 90. This will allow nitrogen from cylinder 66 to flow through and purge Train B and the heat from wire 90 to dry the molecular sieve portions 46. After heating wire 90 has been on for approximately 2 hours, valve $V_1$ will open to allow hydrogen from cylinder 64 to flow through Train B and thereby regenerate catalyst portion 48. After a regeneration period of about 1 hour, valve $V_1$ will close and current to heating wire 90 will go off. After the train has cooled for about 3 hours, valves $V_2$, $V_4$ and $V_{10}$ will close and timer motor 38 will again be shut off by rotation of cam 39a. Regeneration of Train B is complete at this point and further initiation of the timer motor unit is returned to oxygen analyzer 26 (as explained hereinabove). Referring to the regeneration sequence of Train B, it will be readily apparent that with valves $V_5$ and $V_7$ open and valves $V_6$ and $V_8$ closed, the inert gas atmosphere in box 20 will circulate through Train A at the same time that Train B is being regenerated.

By providing a dual train chemical purifying unit in which the dry box atmosphere may be circulated through one train in the unit to purify the atmosphere, at the same time that the second train in the unit is being regenerated, presents a distinct advantage over any of the known systems. The obvious advantages of the present system are (1) it eliminates any "down time" of the dry box which is required to regenerate the purifying unit and (2) the system will automatically maintain the minimum preset levels of oxygen and water in the dry box for an indefinite period of time without requiring the attention of an operator.

While the inventive concept is specifically described in the foregoing specification and drawing, it will be understood that numerous modifications and variations as to form, size, arrangement of parts, operation and mechanical details can be made without departing form the scope of the invention.

What is claimed is:
1. Apparatus for automatically controlling the amount of oxygen in the inert gas atmosphere of a dry box at a predetermined level, which includes, in combination:
 an oxygen analyzer connected to the dry box, said analyzer being adapted to detect the level of oxygen present in the inert atmosphere of said dry box;
 a dual chemical purifying train unit, including a first purifying train and a second purifying train connected to the dry box, each of said purifying trains having an oxygen-removing material therein and a heating wire enclosing each train;

solenoid-actuated valve means associated with said first and second purifying trains;

container means connected to said first and second purifying trains, said container means having a gas mixture therein suitable for regenerating the oxygen-removing material in said purifying trains and for purifying trains, said container means having a gas solenoid actuated valve means associated therewith;

a timer motor assembly electrically connected to said oxygen analyzer, said assembly including a timer motor and a battery of timer cams, said timer cams being electrically connected to the solenoid-actuated valve means of said first and second purifying trains, the heating wire of each train, and said container means; whereby when the oxygen level in said dry box exceeds a predetermined level, the oxygen analyzer will actuate the timer motor to rotate the timer cams therein and thereby operate the solenoid actuated valves associated with said first and second purifying trains, said heating wires, and said container means to effect (1) removal of oxygen from the inert gas atmosphere of said dry box by circulation through said first purifying train, and, simultaneously (2) regeneration of said second purifying train by heating the oxygen-removing material in the train with heat from said heating wires and by allowing the gas from said container means to flow through the second train, and (3) reversal of the above procedure when the oxygen-removing material in said first purifying train becomes saturated with oxygen and thereby requires regeneration.

2. The apparatus of claim 1 wherein the dual chemical purifying train unit comprises a pair of cylinders, the center section of each cylinder being packed with a layer of oxygen-removing material, said oxygen-removing material separating layers of water-removing material packed in either end of each cylinder.

3. The apparatus of claim 2 in which the oxygen-removing material is selected from the group consisting of a finely divided copper-nickel mixture on a gamma-alumina carrier, a finely divided copper on a silica gel carrier, a finely divided copper-nickel mixture on a diatomaceous earth carrier and a copper-mercury mixture on an activated alumina carrier.

4. The apparatus of claim 1 wherein the oxygen analyzer is set to detect a level of about 1 p.p.m. oxygen in the inert gas atmosphere of said dry box.

5. Apparatus for automatically controlling the amount of water in the inert gas atmosphere of a dry box at a predetermined level, which includes, in combination:

a water analyzer connected to the dry box, said analyzer being adapted to detect the level of water present in the inert atmosphere of said dry box;

a dual chemical purifying train unit including a first purifying train and a second purifying train connected to the dry box, each of said purifying trains having a water-removing material therein and a heating wire enclosing each train;

solenoid-actuated valve means associated with said first and second purifying trains;

container means connected to said first and second purifying trains, said container means having a gas therein suitable for purging the water-removing material in said purifying trains, said container means also including solenoid-actuated valve means associated therewith;

a timer motor assembly electrically connected to said water analyzer, said assembly including a timer motor and a battery of timer cams, said timer cams being electrically connected to the solenoid-actuated valve means of said first and second purifying trains, the heating wire of each train, and said container means; whereby when the water lever in said dry box exceeds a predetermined level, the water analyzer will actuate the timer motor to rotate the timer cams therein and thereby operate the solenoid-actuated valves associated with said first and second purifying trains, said heating wires and said container means to effect (1) removal of water from the inert gas atmosphere of said dry box by circulation through said first purifying train, and, simultaneously (2) regeneration of said second purifying train by purging the train with gas from said container means and by drying the water-removing material in said train with heat from said heating wires and (3) reversal of the above procedure when the water-removing material in said first purifying train becomes saturated with water and thereby requires regeneration.

6. The apparatus of claim 5 wherein the dual chemical purifying train unit comprises a pair of cylinders, the center section of each cylinder being packed with a layer of an oxygen-removing material, said oxygen-removing material separating layers of water-removing material packed in either end of each cylinder.

7. The apparatus of claim 6 in which the water-removing material is selected from the group consisting of activated alumina, magnesium perchlorate, and silica gel.

References Cited

UNITED STATES PATENTS

| | | | |
|---|---|---|---|
| 1,996,379 | 4/1935 | Keller | 148—203 XR |
| 2,577,720 | 12/1951 | Waller | 23—288.8 |
| 3,279,151 | 10/1966 | Kauer, et al. | 55—163 XR |
| 3,306,711 | 2/1967 | Angerhofer | 23—26 XR |

JAMES H. TAYMAN, JR., Primary Examiner

U.S. Cl. X.R.

23—260, 289, 232; 236—44; 148—16.7; 55—20, 33, 74, 163, 160; 34—46; 252—372

PO-1050
(5/69)

UNITED STATES PATENT OFFICE
CERTIFICATE OF CORRECTION

Patent No. 3,519,398  Dated July 7, 1970

Inventor(s) Charles B. Roberts

It is certified that error appears in the above-identified patent and that said Letters Patent are hereby corrected as shown below:

Column 5, line 1, delete "thread" and insert --through--.

Column 7, line 9, delete "purifying" and insert --purging the-- and delete "having a gas" and insert --including--.

SIGNED AND
SEALED
DEC 2 1971

(SEAL)
Attest:

Edward M. Fletcher, Jr.
Attesting Officer

WILLIAM E. SCHUYLER, JR.
Commissioner of Patents